(12) United States Patent
Swanson et al.

(10) Patent No.: US 10,794,637 B2
(45) Date of Patent: Oct. 6, 2020

(54) CIRCULAR HEATSINK

(71) Applicant: GE AVIATION SYSTEMS LLC, Grand Rapids, MI (US)

(72) Inventors: Judd Everett Swanson, Plantation, FL (US); Richard Eddins, Margate, FL (US); Michel Engelhardt, Woodbury, NY (US); Christopher Mouris Astefanous, Centereach, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 999 days.

(21) Appl. No.: 15/283,984

(22) Filed: Oct. 3, 2016

(65) Prior Publication Data

US 2018/0094876 A1    Apr. 5, 2018

(51) Int. Cl.
| | |
|---|---|
| *F28F 3/02* | (2006.01) |
| *F01D 25/12* | (2006.01) |
| *F02C 7/18* | (2006.01) |
| *F02C 7/12* | (2006.01) |
| *F02C 7/00* | (2006.01) |

(52) U.S. Cl.
CPC ............... *F28F 3/02* (2013.01); *F01D 25/12* (2013.01); *F02C 7/12* (2013.01); *F02C 7/18* (2013.01); *F02C 7/00* (2013.01); *F05D 2250/231* (2013.01); *F05D 2260/20* (2013.01); *F05D 2260/22141* (2013.01); *Y02T 50/676* (2013.01)

(58) Field of Classification Search
CPC .... F28F 3/02; F01D 25/12; F02C 7/00; F02C 7/12; F02C 7/18; F05D 2250/231; F05D 2260/20; F05D 2260/22141; H01L 23/467; H02K 9/02; H02K 9/04; H02K 9/06; H02K 5/18; G06F 1/20; F23R 3/002
USPC ........................................................ 60/806
See application file for complete search history.

(56) References Cited

U.S. PATENT DOCUMENTS

| | | | |
|---|---|---|---|
| 6,239,972 | B1 | 5/2001 | Tehan et al. |
| 6,535,385 | B2 * | 3/2003 | Lee ..................... H01L 23/3672 165/104.33 |
| 6,779,593 | B1 * | 8/2004 | Hegde ....................... F28F 3/02 165/185 |
| 8,593,808 | B2 | 11/2013 | Pal et al. |
| 9,167,720 | B2 | 10/2015 | Uluc et al. |
| 9,192,043 | B2 | 11/2015 | Farner et al. |

(Continued)

FOREIGN PATENT DOCUMENTS

EP    2985225 A1    2/2016

*Primary Examiner* — Mark A Laurenzi
*Assistant Examiner* — Loren C Edwards
(74) *Attorney, Agent, or Firm* — McGarry Bair PC (57) ABSTRACT

A circular heatsink can include a thermally conductive cylinder with an outer circumferential surface and an inner circumferential surface. An emissive and convective and convective surface area can extend radially from the outer circumferential surface. At least one thermally conductive ledge can extend from the inner circumferential surface and be configured to support a planar substrate having heat-generating electrical components. Air flow over the emissive and convective surface area can cause thermal conduction away from the heat-generating electrical components and through the at least one thermally conductive ledge, the thermally conductive cylinder, and the emissive and convective surface area.

10 Claims, 5 Drawing Sheets

(56) References Cited

U.S. PATENT DOCUMENTS

| | | | |
|---|---|---|---|
| 2005/0036289 A1* | 2/2005 | Lee | H01L 23/4006 |
| | | | 361/699 |
| 2006/0120060 A1* | 6/2006 | Boudreaux | H01L 23/3672 |
| | | | 361/809 |
| 2009/0269194 A1* | 10/2009 | Li | F04D 29/542 |
| | | | 415/208.2 |
| 2013/0299145 A1 | 11/2013 | Lee et al. | |
| 2014/0116654 A1 | 5/2014 | McGlaun et al. | |
| 2014/0272385 A1* | 9/2014 | Dickinson | F21V 29/75 |
| | | | 428/323 |
| 2015/0183387 A1* | 7/2015 | Lepage | H05K 7/20136 |
| | | | 307/9.1 |
| 2015/0345510 A1 | 12/2015 | Beers et al. | |

* cited by examiner

CIRCULAR HEATSINK

BACKGROUND OF THE INVENTION

A turbine engine can have a cooling fan in its aft portion for exhausting cooling air and can include a rotating shaft and a generator driven by the rotating shaft. For example, an aircraft may have a turbine engine for generating thrust and mechanical energy for driving an AC (alternating current) generator. A voltage converter may convert an AC voltage from the generator to a DC (direct current) or different AC voltage and can reside in a compartment adjacent the turbine. Additionally, control circuitry can be located near the turbine for controlling the cooling fan or the voltage converter. This arrangement can be replicated for a number of electric machines that require supporting high power electronics. Heat generated in the power conversion or distribution system and/or control circuitry can be very concentrated. Typically complex heat exchangers and/or forced liquid cooling are required to dissipate heat from such electrical components Also, such circuitry requires a finite amount of space which may be at a premium in various applications.

SUMMARY OF THE INVENTION

In one aspect, a circular heatsink includes a thermally conductive cylinder having an outer circumferential surface and an inner circumferential surface, with an end adapted to connect to a cooling fan with a rotating shaft extending axially through the thermally conductive cylinder. An emissive and convective surface area can extend radially from the outer circumferential surface. At least one thermally conductive ledge can extend radially inwardly from the inner circumferential surface and be configured to support a planar substrate having heat-generating electrical components for controlling the cooling fan within the thermally conductive cylinder. Air flow from the cooling fan over the emissive and convective surface area can cause thermal conduction away from the heat-generating electrical components and through the at least one thermally conductive ledge, the thermally conductive cylinder, and the emissive and convective surface area.

In one aspect, there is disclosed a turbine engine comprising a cooling fan having a rotating shaft and a cooling fan controller mounted axially to the cooling fan. The cooling fan controller has a thermally conductive cylinder with an outer circumferential surface and an inner circumferential surface, where an emissive and convective surface area extends radially from the outer circumferential surface. At least one thermally conductive ledge extends from the inner circumferential surface. A planar substrate has heat-generating electrical components for controlling the cooling fan and mounted to the thermally conductive ledge or ledges. Air flow from the cooling fan can pass over the emissive and convective surface area and can cause thermal conduction away from the heat generating electrical components and through the thermally conductive ledge or ledges, the thermally conductive cylinder, or the emissive and convective surface area.

DETAILED DESCRIPTION

As may be appreciated, based on the disclosure, there exists a need in the art for a simpler and more compact manner of removing heat from an electric power converter.

Figure 1:
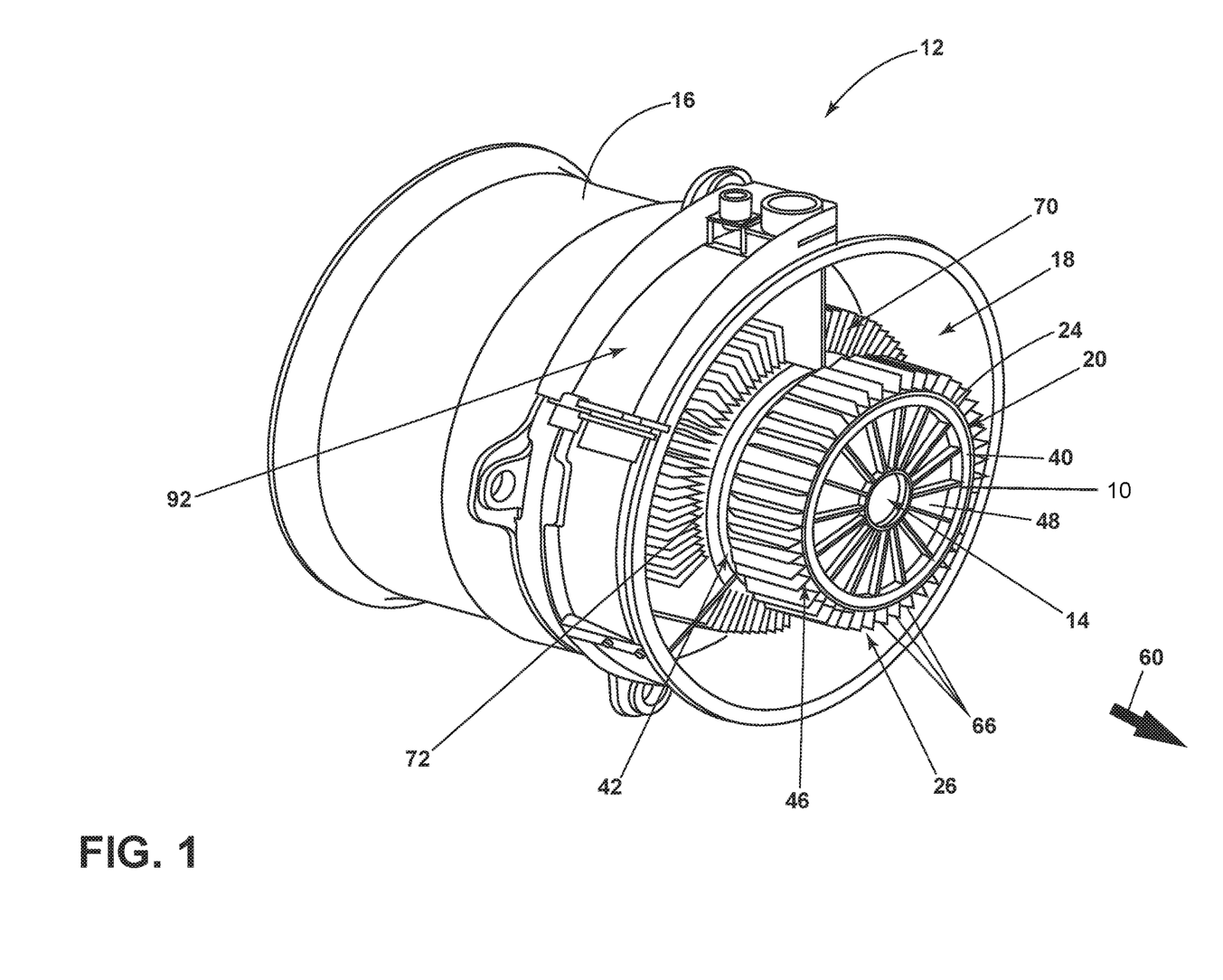
FIG. 1 illustrates a perspective view of a cooling fan with an axially mounted fan controller, in accordance with various aspects described herein.
Figure 3:
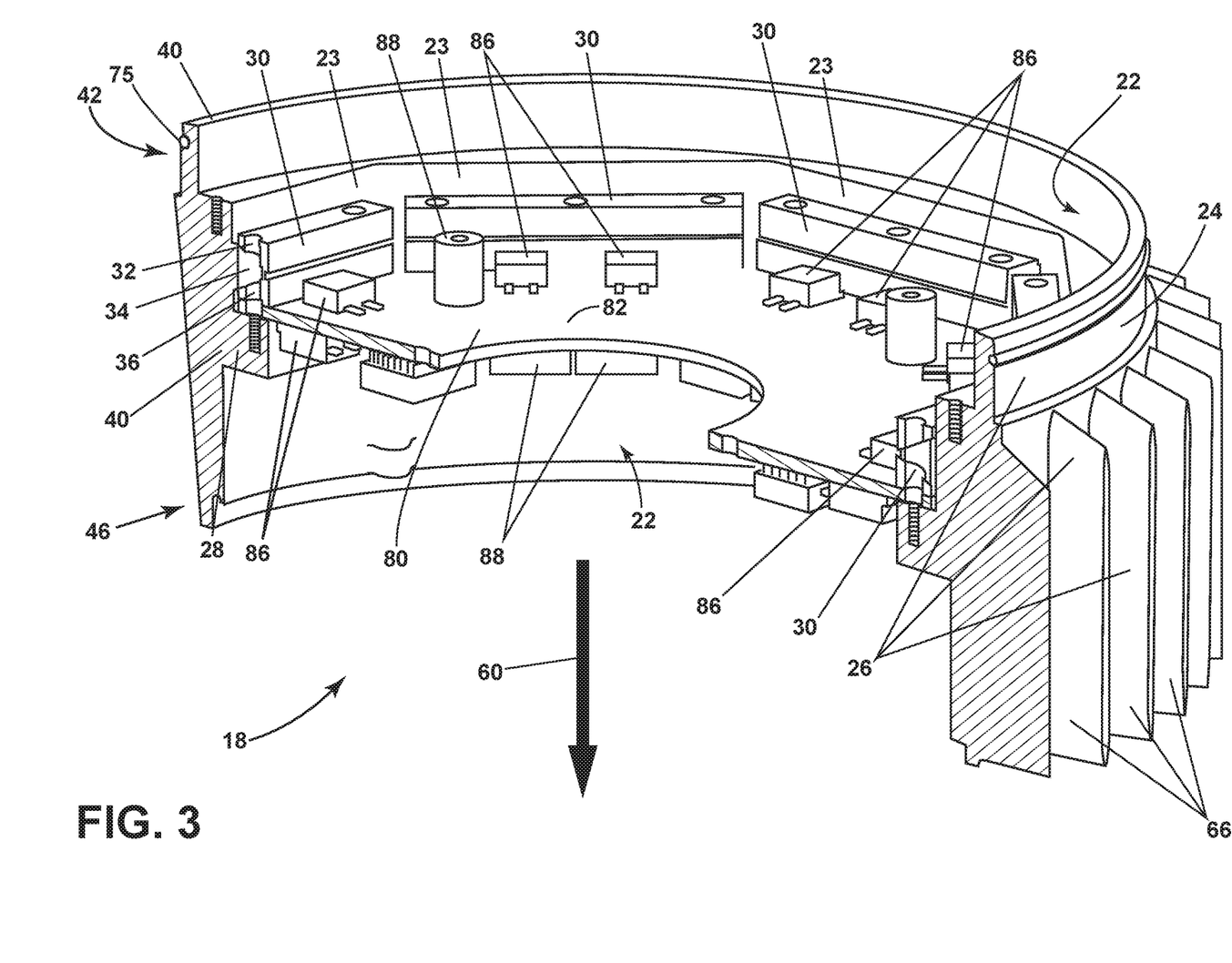
FIG. 3 illustrates a perspective sectional view of the fan controller of FIG. 1 showing a planar substrate, in accordance with various aspects described herein.

Referring to FIG. 1, in one aspect of the present disclosure, we describe the outer features of a turbine engine which can comprise a cooling fan 12 having a rotating shaft 14 with a cooling fan controller 18 mounted axially to the cooling fan 12. Subsequent figures will describe the inner features of the cooling fan controller 18. The cooling fan controller 18 can include a thermally conductive cylinder 20 with an outer circumferential surface 24. The outer circumferential surface 24 can have an emissive and convective surface area 26 extending radially from the outer circumferential surface 24. In one aspect, the emissive and convective surface area 26 can include a plurality of cooling fins 66 arrayed circumferentially and aligned with the air flow 60. Fan controller 18 can include a voltage converter, a rectifier, electronics to control the cooling fan 12, or other electronics associated with the turbine engine. The electronics within the fan controller can be heat-generating electrical components 86 mounted to a planar substrate 80 (FIG. 3). The present disclosure describes an improvement in thermal conduction away from the heat-generating electrical components of a fan controller 18 using air flow 60.

Continuing with FIG. 1, fan housing 16 can surround cooling fan 12 and can function as a plenum for the air flow 60. The turbine engine can include a generator (not shown) driven by rotating shaft 14 and generating electrical power for electrical loads on an aircraft or a ground vehicle. Cooling fan 12 can direct air flow 60 over a fan heatsink 70 for cooling the generator, a fan motor, or other electronics within the fan heatsink 70. A forward end 42 of the thermally conductive cylinder 20 can be mounted axially to the cooling fan 12 to take advantage of air flow 60 and can be mounted so that the fan heatsink 70 is directly upstream of emissive and convective surface area 26. Circular heatsink 10 including thermally conductive cylinder 20 can be configured to direct a portion of the thermal conduction away from the heat-generating electrical components and to fan heatsink 70, as described in subsequent figures. Cooling fan 12 can include an EMI (electromagnetic interference filter) 92 on fan housing 16 for filtering power coming from fan controller 18. The arrangement of the fins on the outer circumference of the radial heatsink are non-evident. Shown here is a base arrangement which may be optimized through those experienced in the art, to induce improved heat transfer and reduce the backpressure on the turbine mechanism. A wall 40 of the cylinder 20 can be thicker at the forward end 42 than at a rear end 46 opposite the forward end 42 for directing a portion of the thermal conduction into the fan heatsink 70 and another portion of the thermal conduction to cooling fins 66. A rear cover 48 can be applied to cover the rear end 46 and can be configured to absorb a portion of the thermal conduction. Additionally, an outer surface 72 of the fan heatsink 70 can be tapered for a smoother air flow 60 and the outer circumferential surface 24 can be aligned with the outer surface 72 to streamline the air flow 60 over emissive and convective surface area 26. The cooling fan 12 can also include multiple stator blades (not shown) directing the air flow 60 wherein each of one or more of the plurality of cooling fins 66 is aligned with one of the multiple stator blades for minimizing turbulence in the air flow 60. Alternatively, fan heatsink 70 can include stator blades which double as heatsink fins and to which each of the cooling fins 66 are aligned to enhance thermal conduction to cooling fins 66. In another aspect, each of a majority of the plurality of cooling fins 66 can be aligned with one of the multiple stator blades in order to substantially improve thermal conduction away from cooling fins 66.

Beneficially, several of the features described above can be combined to create an improved and minimized operating temperature for the heat-generating electrical components 86 (FIG. 3), including, but not limited to, axially mounting the forward end of thermally conductive cylinder 20 to an aft end of cooling fan 12, tapering of the wall 40 to balance thermal conduction between fan heatsink 70 and emissive and convective surface area 26, aligning outer circumferential surface 24 with fan heatsink 70, and aligning cooling fins 66 with stator blades of the cooling fan 12. The benefits of the present disclosure can be applied to any electric machine having heat-generating electrical components needing thermal conduction away from them, including but not limited to a turbo-diesel, a turbofan engine, or to other kinds of turbine engines generating a cooling air flow. Additional aspects of the present disclosure, including inner features, will now be described.

Figure 2:
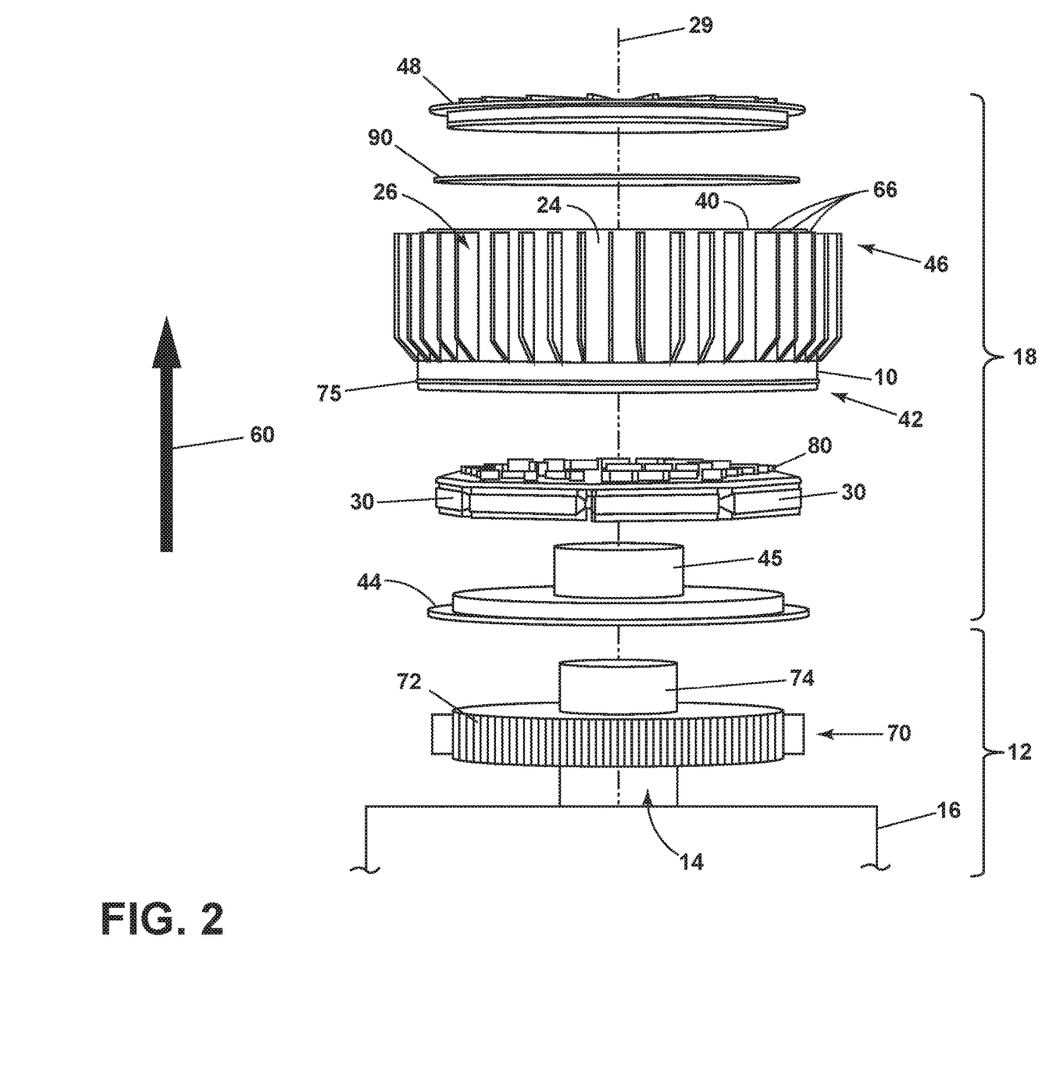
FIG. 2 illustrates an exploded side view of the fan controller in FIG. 1, in accordance with various aspects described herein.

Referring now to FIG. 2, in various aspects, an exploded side view of the fan controller 18 can include planar substrate 80 containing heat-generating electrical components 86 mounted inside of thermally conductive cylinder 20. Planar substrate 80 can be perpendicular to a longitudinal axis 29 of the cylinder 20. A forward cover 44 can cover the forward end 42 of the thermally conductive cylinder 20 and a hub vault 45 can be disposed in the forward cover 44 for clearing the rotating shaft 14. Alternately, fan hub 74 can protrude axially from cooling fan 12 in line with rotating shaft 14 and not be rotating itself, where hub vault 45 is sized to clear the fan hub 74. An O-ring 75 can be disposed on the forward end 42 of thermally conductive cylinder 20 to seal fan controller 18 to cooling fan 12. An auxiliary substrate 90 can also mount inside thermally conductive cylinder 20 and install from the rear end 46. Auxiliary substrate 90 can be a control circuit of fan controller 18 or can be another planar substrate 80 containing heat-generating components 86. A plurality of wedge clamps 30 can be secured to planar substrate 80 for transferring thermal conduction from heat-generating electrical components 86 to an inner circumferential surface 22 of cylinder 20, as will be described further in FIG. 3 below.

FIG. 3 illustrates various aspects of the fan controller 18 introduced in FIG. 1, where the wall 40 of thermally conductive cylinder 20 (see FIG. 1) can be defined by the inner circumferential surface 22 and the outer circumferential surface 24. At least one thermally conductive ledge 28 can extend radially inwardly from the inner circumferential surface 22 to support planar substrate 80 mounted to the thermally conductive ledge 28. Air flow 60 passing over the emissive and convective surface area 26 can induce thermal conduction away from heat-generating electrical components 86 and through the thermally conductive ledge 28, the thermally conductive cylinder 20, and the emissive and convective surface area 26. The thermally conductive ledge 28 can provide a widened thermal path into wall 40 for directing thermal conduction to various heat sinks, including but not limited to emissive and convective surface area 26, fan heatsink 70, and rear cover 48. The dimensions of ledge 28 and wall 40 can be optimized to balance the thermal conduction in accordance with the heat sinking capabilities of each heat sink. Auxiliary electrical components 88 can also be disposed on planar substrate 80 for fulfilling an electrical function of the fan controller 18.

Continuing with FIG. 3, fan controller 18 can further include a wedge clamp 30 thermally coupling a top side 82 of the planar substrate 80 opposite the thermally conductive ledge 28 to wall 40 through inner circumferential surface 22. Thermal conduction can also occur between the planar substrate 80 and a side of planar substrate 80 contacting thermally conductive ledge 28. The wedge clamp 30 can include a middle layer 34 with a triangular cross section that slidably ejects a circumferential face 35 of the middle layer 34 against the inner circumferential surface 22 when squeezed between a clamping layer 32 of the wedge clamp 30 stacked above the middle layer and a substrate layer 36 of the wedge clamp 30 stacked below the middle layer. Substrate layer 36 can be in thermal contact with the top side 82 of planar substrate 80. For example, substrate layer 36 can be soldered to substrate 80.

The squeezing of middle layer 34 can be accomplished by a fastener inserted from above and into planar substrate 80 (FIG. 4), by a pressure mechanism pushing on clamping layer 32 from above (not shown), by a drawing mechanism or fastener inserted from below substrate layer 36 (not shown), or by any other means able to exert a squeezing force from sliding planes contacting the triangular cross section of middle layer 34 from above and below. In the present disclosure, the middle layer 34 can include a top and a bottom sliding planar surface at opposite acute angles to planar substrate 80 and meeting at circumferential face 35, where clamping layer 32 and substrate layer 36 each have a complementary planar surface for sliding against the middle layer 34. Advantageously, the squeezing of the wedge clamp 30 can direct a portion of the thermal conduction from heat-generating electrical components 86 to wall 40 through inner circumferential surface 22, while another portion of thermal conduction can flow from components 86 to thermally conductive ledge 28, thereby improving the overall thermal conduction from components 86 and minimizing their operating temperature.

Continuing with FIG. 3, in various aspects, the inner circumferential surface 22 can be flatted to form a polygonal perimeter of flatted sections 23 above the planar substrate 80, the circumferential face 35 mating with one of the flatted sections 23. Alternatively, inner circumferential surface 22 and circumferential face 35 can be circular where the squeezing of middle layer 34 can create a flush contact between the two. There can be two or more wedge clamps 30 distributed around a top side perimeter of planar substrate 80 in small arcs of the inner circumferential surface 22. Wedge clamp 30 can be restricted to a limited length of elongated sliding layers in order to accommodate a squeezing force that creates an ejection force in only one direction and which cannot impose a mating force along a wide arc of a circular perimeter. For example, the perimeter of inner circumferential surface can be broken up into eight flatted sections 23, each section 23 having one wedge clamp 30 assigned to it. Beneficially, air flow 60 over emissive and convective surface area 26 can conduct heat away from the electrical components 86 and through the at least one thermally conductive ledge 30, the thermally conductive cylinder 20, and the emissive and convective surface area 26.

Figure 4:
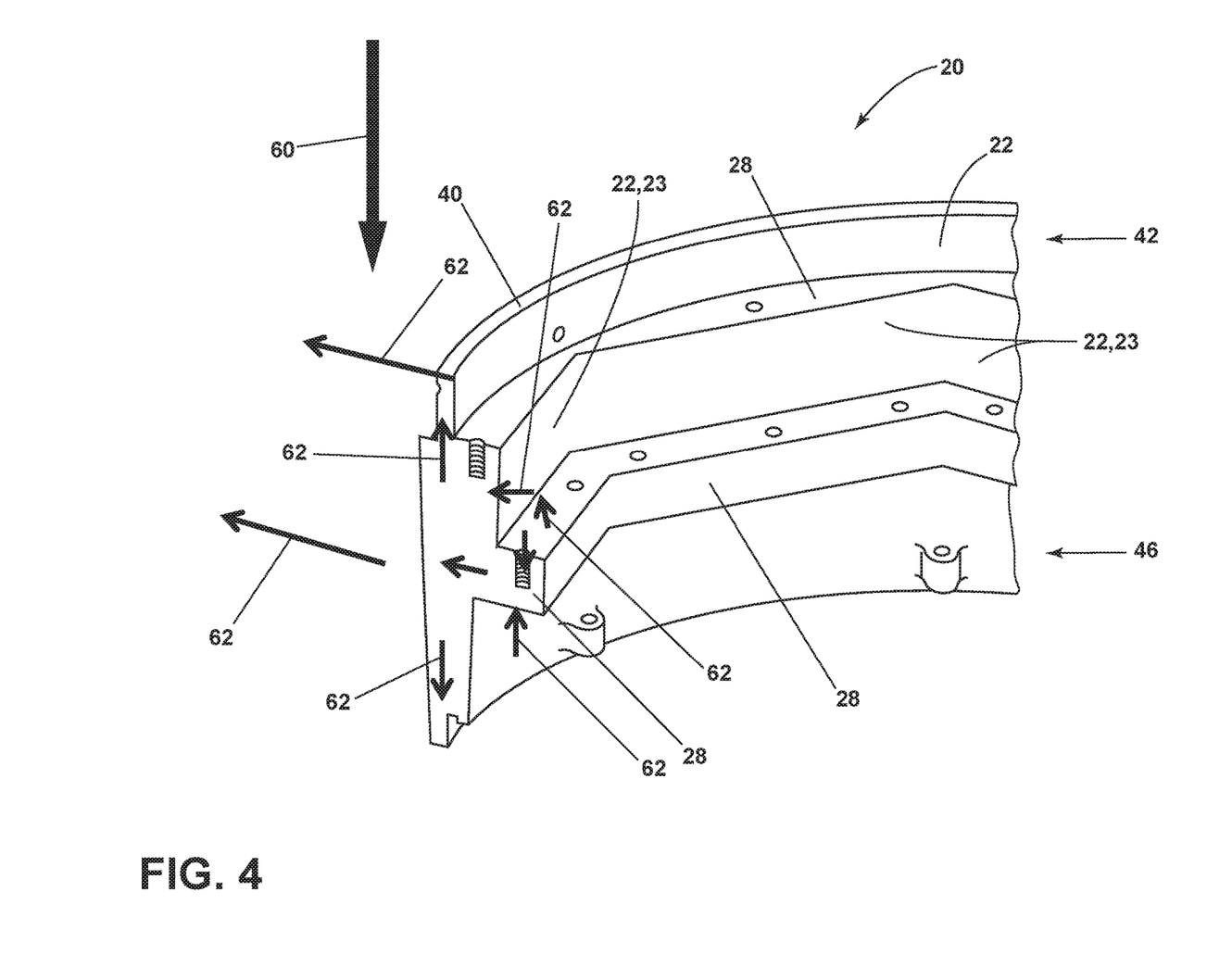
FIG. 4 illustrates a perspective sectional view of the wedge clamp of FIG. 1, in accordance with various aspects described herein.

Referring to FIG. 4, in various embodiments, heat flow 62 can flow up through wedge clamp (not shown) and into inner circumferential surface 22, into wall 40 to emissive and convective surface area 26, to cooling fins 66 (shown in FIGS. 1 and 2), down to rear end 46 and up to forward end 42 of the thermally conductive cylinder 20. Heat can also flow from a bottom side (not shown) of planar substrate 80 into ledge 28 for conduction to wall 40. In addition, another planar substrate could be installed (not shown) underneath ledge 28 with its own set of wedge clamps 30, directing heat flow 62 up into ledge 28. Thermally conductive cylinder 20 can be made of metal which can include but is not limited to aluminum, copper, or steel, or cylinder 20 can be made of graphene. A vapor chamber or heat pipe (not shown) can be included in various portions of thermally conductive cylinder 20 to enhance thermal conduction to the emissive and convective surface area 26, to distribute heat more evenly along a length of cylinder 20, or to prevent hot spots that could cause metal fatigue.

The presently disclosed features for balancing thermal conduction to the various heat sinks within the fan controller 18 can avoid hoop stress common when heat dissipation is particularly dense. Advantageously, due to the simple and non-overlapping shaping of the cylinder 20, ledges 28, and the suggested tapering, custom shaping of the thermally conductive cylinder 20 can minimize the operating temperature of heat-generating electrical components 86. Electrical components 86 can be silicon carbide MOSFET devices, and can be tolerant of the higher temperatures imposed by the temperature of the air flow 60 from a cooling fan 12. For example, a silicon carbide device can have a maximum operating temperature of 105 degrees or more instead of the 70 degree limit common to electrical components. Despite a harsh turbine engine environment, the use of complex heat exchangers or forced liquid cooling can be avoided for a fan controller by combining the features of the described cylindrical heatsink with silicon carbide devices and an existing cooling air flow while eliminating thermally induced stresses.

Figure 5:
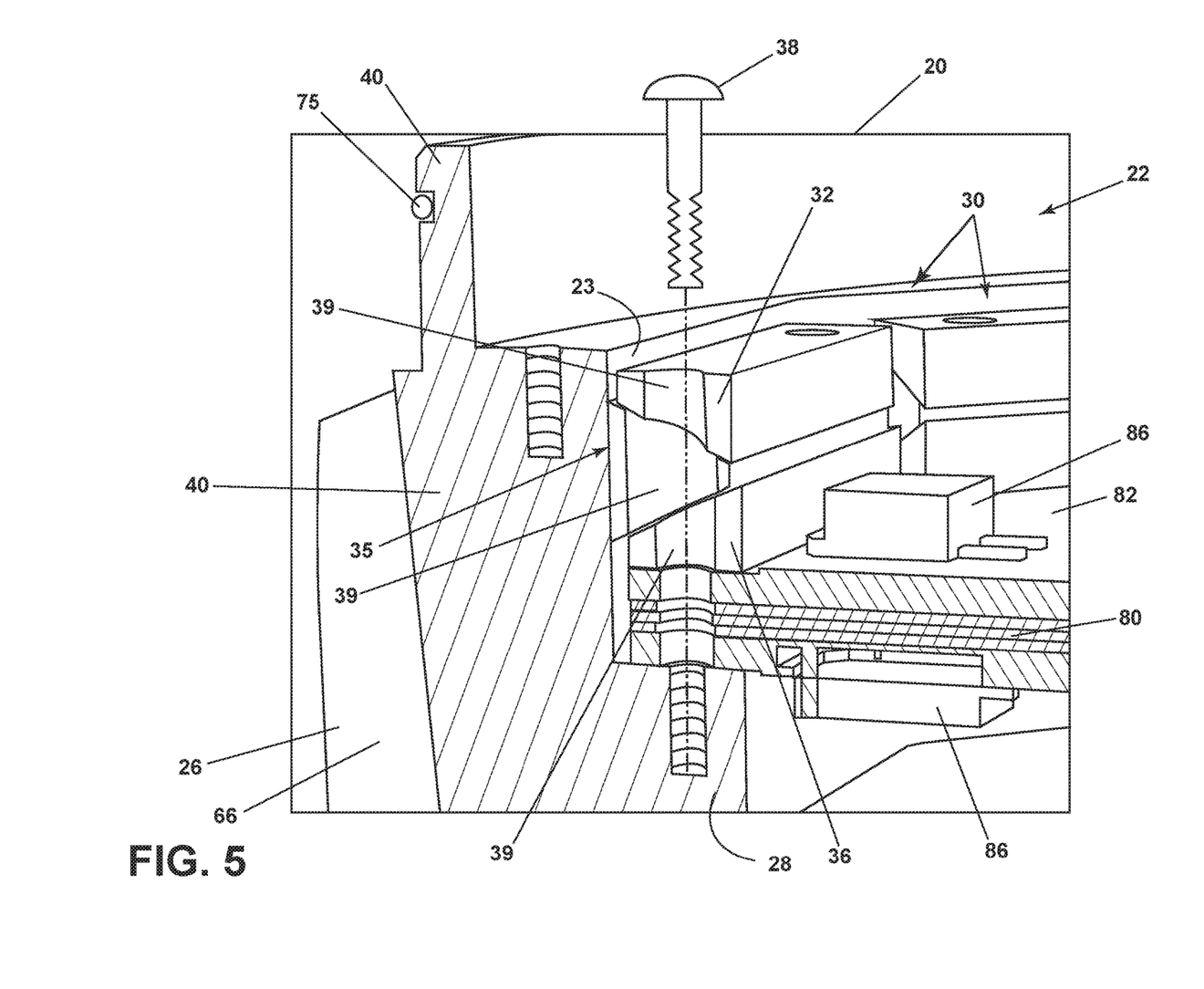
FIG. 5 illustrates a perspective sectional view of the heat flow of FIG. 1, in accordance with various aspects described herein.

FIG. 5 illustrates, in various aspects, the wedge clamp 30 of FIG. 3, where when substrate layer 36 and clamping layer 32 squeeze middle layer 34, circumferential face 35 is pressed against inner circumferential surface 22 to conduct heat from the top side 82 of substrate 80 to wall 40 of the cylinder 20. A clamp fastener 38 can extend through an aperture 39 in each of the multiple stacked layers 32, 34, and 36 and into the thermally conductive ledge 28 for squeezing the clamping layer 32 toward the substrate layer 36. Layers 32 and 36 can be pulled back slightly from inner circumferential surface 22 to insure a controlled contact of middle layer 34 with surface 22. An aperture through middle layer 34 can be elongated in a radial of the cylinder 20 to allow for the sliding action caused by the squeezing action.

In other aspects, a circular heatsink for applications other than a fan controller can include the thermally conductive cylinder 20, the emissive and convective surface area 26, the thermally conductive ledge 28, and can utilize the air flow 60 over the emissive and convective surface area 26 to conduct heat away from heat-generating components 86 on a planar substrate 80 mounted to the ledge 28. The circular heatsink can further include a plurality of cooling fins 66, the wedge clamp 30, and flatted sections 23 of the inner circumferential surface 22. The forward end 42 can be mounted axially to a source of cooling air (not shown), and wall 40 can be thicker at the forward end 42 to direct thermal conduction to the source of cooling air. In various embodiments of the fan controller 18 and the circular heatsink 10, the emissive and convective surface area 26 can have a high-emissivity coating, such as black paint, to enhance radiative loss.

Many other possible embodiments and configurations in addition to that shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising;
    a cooling fan having a rotating shaft; and
    a cooling fan controller mounted axially to the cooling fan, the cooling fan controller having:
        a thermally conductive cylinder having an outer circumferential surface and an inner circumferential surface;
        an emissive and convective surface area extending radially from the outer circumferential surface;
        at least one thermally conductive ledge extending radially inwardly from the inner circumferential surface; and
        a planar substrate having heat-generating electrical components for controlling the cooling fan and mounted to the at least one thermally conductive ledge within the thermally conductive cylinder;
        wherein air flow from the cooling fan passes over the emissive and convective surface area and causes thermal conduction away from the heat-generating electrical components and through the at least one thermally conductive ledge, the thermally conductive cylinder, or the emissive and convective surface area.

2. The turbine engine of claim 1 wherein a forward end of the thermally conductive cylinder mounts axially to the cooling fan which includes a fan heatsink upstream of the emissive and convective surface area.

3. The turbine engine of claim 2 wherein a wall of the cylinder defined by the inner and outer circumferential surfaces is thicker at the forward end than at a rear end of the thermally conductive cylinder opposite the forward end for directing a portion of the thermal conduction into the fan heatsink.

4. The turbine engine of claim 3 wherein the outer circumferential surface is tapered from an outer surface of the fan heatsink to the rear end for streamlining the air flow.

5. The turbine engine of claim 2 further comprising a forward cover covering the forward end and a hub vault in the forward cover for clearing the rotating shaft.

6. The turbine engine of claim 1 wherein the emissive and convective surface area includes a plurality of cooling fins arrayed circumferentially and aligned with the air flow.

7. The turbine engine of claim 6 wherein the cooling fan includes multiple stator blades directing the air flow and wherein a majority of the plurality of cooling fins is aligned with at least one of the multiple stator blades for minimizing turbulence in the air flow.

8. The turbine engine of claim 1 further comprising a wedge clamp thermally coupling a top side of the planar substrate opposite the thermally conductive ledge and including a middle layer with a triangular cross section that slidably ejects a circumferential face of the middle layer against the inner circumferential surface when squeezed between a clamping layer stacked above the middle layer and a substrate layer stacked below the middle layer.

9. The turbine engine of claim 8 wherein the inner circumferential surface is flatted to form a polygonal perimeter of flatted sections above the planar substrate, a circumferential face mating with one of the flatted sections.

10. The turbine engine of claim 8 further comprising a clamp fastener extendable through the wedge clamp and into the at least one thermally conductive ledge and operable to press the clamping layer toward the substrate layer.

* * * * *